United States Patent [19]
Watanabe et al.

[11] Patent Number: 6,038,270
[45] Date of Patent: *Mar. 14, 2000

[54] RADIO RECEIVER APPARATUS AND RADIO RECEIVING METHOD

[75] Inventors: Hidekazu Watanabe, Tokyo, Japan; Hamid Amir-Alikhani, Leonberg, Germany

[73] Assignees: Sony Corporation, Tokyo, Japan; Sony United Kingdom Limited, Weybridge, United Kingdom

[*] Notice: This patent is subject to a terminal disclaimer.

[21] Appl. No.: 08/861,166

[22] Filed: May 21, 1997

[51] Int. Cl.$^7$ ........................................................ H04L 7/04
[52] U.S. Cl. ........................... 375/343; 375/368; 370/514
[58] Field of Search .................................... 375/343, 354, 375/362, 365, 368; 370/206, 509, 514

[56] References Cited

U.S. PATENT DOCUMENTS

| | | | |
|---|---|---|---|
| 5,657,356 | 8/1997 | Ozaki | 375/346 |
| 5,809,009 | 9/1998 | Matsuoka et al. | 370/206 |
| 5,883,929 | 3/1999 | Wang et al. | 375/367 |

FOREIGN PATENT DOCUMENTS

| | | |
|---|---|---|
| 0551803 | 7/1993 | European Pat. Off. . |
| 0788263 | 8/1997 | European Pat. Off. . |
| WO 9110305 | 7/1991 | WIPO . |

*Primary Examiner*—Amanda T. Le
*Attorney, Agent, or Firm*—Frommer Lawrence & Haug, LLP; William S. Frommer

[57] ABSTRACT

A radio receiver apparatus and method for decoding a received signal based on a predetermined pattern of synchronization signal which is inserted in a predetermined period comprising demodulating a received signal to a base band signal, decoding the demodulated signal to a data signal, generating a reference signal based on an output of the decoding and detecting a complex correlation value between the data signal and the reference signal wherein the detected synchronizing signal is based on the detected complex correlation value and decoding is based on the detected synchronization signal.

20 Claims, 6 Drawing Sheets

RADIO RECEIVER APPARATUS AND RADIO RECEIVING METHOD

FIELD OF THE INVENTION

This invention relates to a radio receiver apparatus and a radio receiving method, for example, it is suitable to use for a digital mobile telephone apparatus which encodes audio signal and transmits/receives the signal.

BACKGROUND OF THE INVENTION

Digital cellar system including digital mobile telephone apparatuses has used to TDMA (Time Division Multiple Access) format using coded audio signal, and it is possible to be used by plural subscriber apparatuses only in one channel. Concretely, subscriber apparatus selects a channel having strongest electric field by scanning whole 124 channels at the time of reaching radio wave. And the apparatus detects a control channel allocated to each region, and receive the channel. In this system, the number of available channels per one cell is 124. A position of the control channel is not fixed to a specific channel of said 124 channels. Therefore, an apparatus of this system is scanning whole 124 channels sequentially, sorting them in order for signal strength, and searching FCCH (Frequency Control Channel) in the list sorted. Control channel searched in this manner is used for generating time slots, and transmitting many kinds of information. In this digital cellar system, it is used for transmitting information from each subscriber to a base station, communicating between adjacent base stations, and calling subscriber from a base station.

The subscriber detects signal which is inserted periodically in this control channel. And it adjusts operating timing based on this signal, and detects a coarse position of time slot of existence of necessary information.

The signal in the frequency control channel is synchronized by a bit pattern continuing zeros for predetermined number of bits in the case of being received and decoded by the digital mobile phone subscriber. And it is transmitted after GMSK (Gaussian filtered Minimum Shift Keying) modulation with differential coding.

The FIG. 1 shows a signal in the FCCH, which is complex of I and Q signal having modulated information to two sinusoidal waves which have 90 degree phase difference. The frequency of this signal is offset +67.7 kHz from a carrier frequency.

A digital mobile phone apparatus detects a timing of FCCH signal from received signal by a band pass filter, and synchronizes whole operation of this set based on detected timing.

In such case of filtering FCCH signal by a band pass filter, an accuracy of detection becomes higher corresponding to becoming narrower a bandwidth of the filter. But if bandwidth become narrow, characteristics of a time response become slow.

It becomes difficult to detect a FCCH according to becoming slow of time response characteristics, because a continuous term of the signal of FCCH of a GSM digital cellar system is only 550 μs.

In the digital mobile phone apparatus, sometimes frequency deviation caused by Doppler effect is occurring, and a signal not belonged to FCCH has sometimes same frequency to FCCH. Therefore, if a band pass filter is used, sometimes a timing of a signal of FCCH is detected not correctly or is not detected at all. In this case, it takes much time to ready to communicate because an apparatus tries many times to detect FCCH which is transmitted periodically with predetermined period.

Another method of detecting FCCH is detecting from decoded data stream. An FCCH is being able to detect by a correlation detecting utilizing continuity of decoded data stream or a pattern matching comparing predetermined pattern. But even in this method, much error is occurred because of Doppler deviation, noise, or fading.

Specially, a noise level sometimes become worse for less than 10 dB of Eb/No. (Eb/No is a common value which expresses a state of communication medium. Eb is an energy per one bit for communication. No is a noise power density.) In this case, an error rate of decoded data stream becomes higher, and the FCCH is not detected correctly.

There is the other method for detecting the FCCH that is generating I, Q signal by an orthogonal detecting from received signal, and detecting correlation of I, Q signal utilizing a character that these signal each has an information component with 90 degrees phase difference each other. But if there are many repeating patterns in the signal not in the FCCH, it is much possibility to detect these signal as if signal of FCCH by mistake, because there is much correlation between these signal.

The purpose of this invention is to provide a radio receiver apparatus and a radio receiving method which can detect said synchronized signal of the FCCH easily and correctly.

According to the present invention, there is provided a radio receiver apparatus for decoding a received signal based on a predetermined pattern of synchronization signal which is inserted in a predetermined period, comprising:

demodulating means for demodulating the received signal to a base band signal, decoding means for decoding an output signal of said demodulating means to form a data signal;

reference signal generating means for generating a reference signal based on an output signal of said decoding means; and correlation value detecting means for detecting a complex correlation value between said data signal and said reference signal; wherein said apparatus detects synchronizing signal based on said detected complex correlation value, and decodes based on said detected synchronization signal.

According to the present invention, there is also provided a radio receiving method for decoding a received signal based on a predetermined pattern of synchronization signal which is inserted in a predetermined period, comprising:

a demodulating step for demodulating a received signal to a base band signal;

a decoding step for decoding an output signal of said demodulating step to a data signal;

a reference signal generating step for generating a reference signal based on an output signal of said decoding step; and a correlation value detecting step for detecting a complex correlation value between said data signal and said reference signal, wherein;

the method includes steps of:
    detecting synchronizing signal based on said detected complex correlation value; and
    decoding based on said detected synchronization signal.

The present invention will be more clearly understood from the following description, given by way of example only, with reference to the accompanying drawings in which.

(1) First Embodiment

Figure 2:
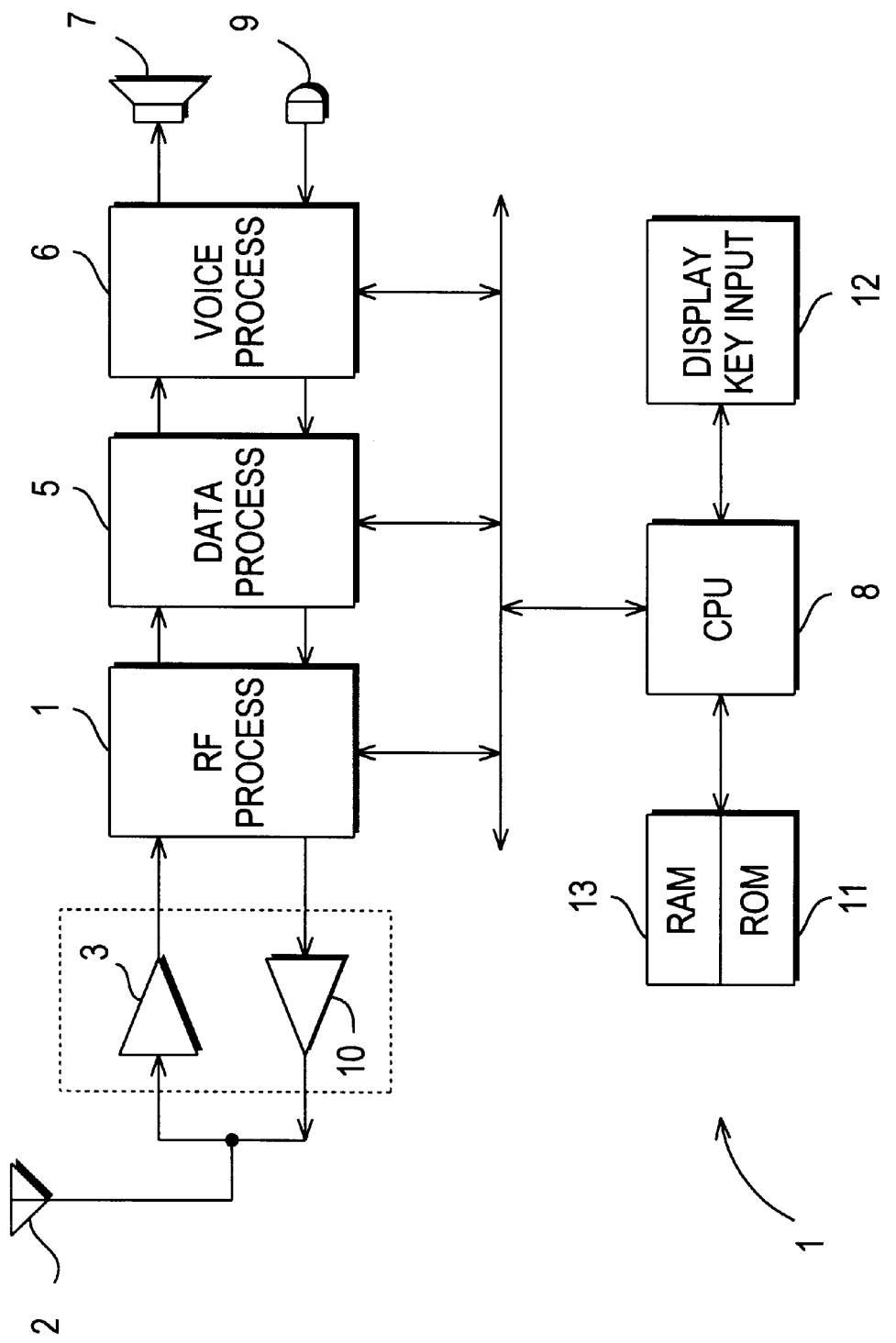
FIG. 2 is a block diagram illustrating a terminal of digital cellular according to one embodiment of this invention.

FIG. 2 is a block diagram of this embodiment of a digital mobile phone subscriber. In this figure, the subscriber 1 receives signal transmitted from a base station by antenna 2, and supplies received signal to an amplifier 3 through an antenna coupler (not shown).

The amplifier 3 supplies the signal to an RF processor 4 after amplifying received signal with predetermined gain. RF processor 4 converts the frequency of received signal with local oscillated signal, so the subscriber 1 can receive desired channel selectively by changing over the frequency of the local oscillator.

RF processor 4 demodulates Q signal with demodulating I signal synchronized to reference phase of received signal, by orthogonal detecting frequency converted received signal. A/D converter circuit samples this I, Q signal with predetermined period, and converts to digital value. A data processing circuit 5 comprises a digital processor which processes I, Q data, and decodes these I, Q data to an original differential coded data. In this process, a viterbi equalizer equalizes and corrects distortion. By using differential coded data, an effect of fading and multi-path is reduced.

A data processing circuit 5 also detects frequency error based on FCCH signal with referring to I, Q data. The result of detection is used as an reference for controlling an operation of the data processing circuit 5 or a reference signal generating circuit. By this process, a frequency error of inner clock signal comparing to the base station is reduced by frame synchronizing to a signal from base station.

Furthermore, a data processing circuit 5 supplies decoded data to an audio processor 6 or a CPU 8.

An audio processor 6 decompresses decoded audio signal, and D/A converter converts it to analog audio signal. And it generates speaker 7, therefore, a subscriber 1 can receive audio signal derived from a caller transmitted from the base station.

CPU 8 receives predetermined information transmitted from the base station, changes a frequency of the local oscillator based on the result of received signal, and changes transmitting/receiving frequency to desired communication channel. Therefore a subscriber 1 can transmit and receive audio signal by selecting predetermined channel.

A transmitting part of the subscriber 1 converts audio signal derived from a microphone 9 to audio data by the audio processor 6, and it generates compressed audio data.

A data processing circuit 5 performs differential coding of output data of the audio processor 6, by adding error correction code and some kind of control codes generated from the CPU 8. RF processing circuit 4 generates transmit signal from differential coded data derived from the data processing circuit 5 by GMSK modulation, and converts frequency of this signal to predetermined frequency. RF processing circuit 4 also supplies frequency converted signal to an antenna 2 through an amplifier 10. Therefore, the subscriber 1 can transmit audio signal and/or calling signal to the base station.

The subscriber 1 changes over a timing of transmitting and receiving based on a predetermined detection result detected by the data processing circuit 5. The subscriber 1 can receive selectively a time slot allocated to this subscriber from the base station by the signal transmitted from the base station to plural subscribers. And the subscriber 1 can transmit audio signal etc. to the base station.

CPU 8 controls an operation of whole apparatus by performing following processes. First, it keeps temporal area in a RAM 13. It executes a control program memorized in a ROM 11. And it supplies control codes to each circuit in necessary. If user pushes predetermined key on a display/key input means 12, the subscriber 1 transmits calling signal to the base station, and if a receiving calling signal from the base station, the receiving channel are changed over.

Figure 3:
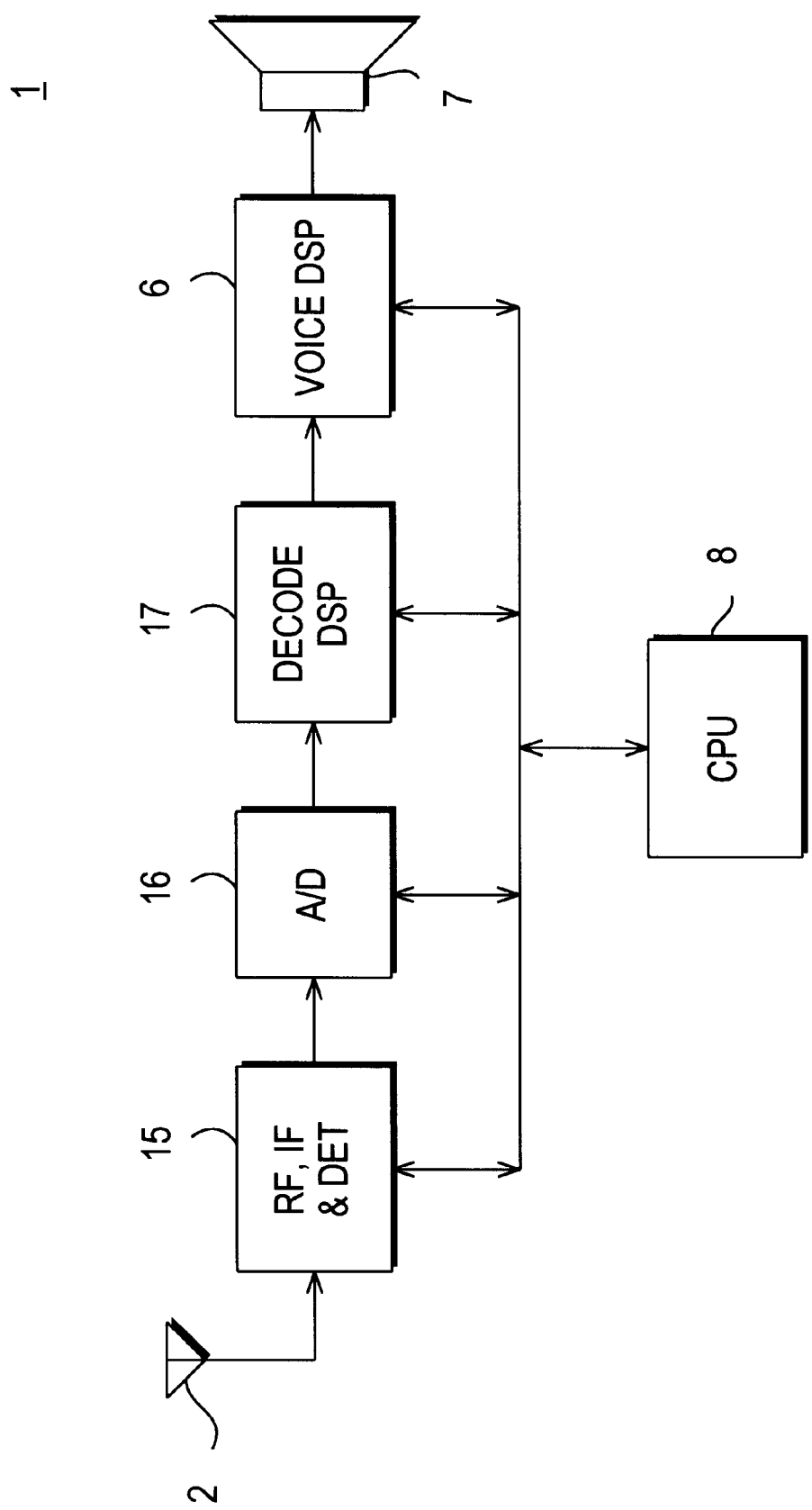
FIG. 3 is a block diagram illustrating its receiver section.

The subscriber 1 receives signal transmitted from the base station by a receiving part described on FIG. 3. The subscriber 1 comprises RF amplifier, IF amplifier, and detector 15, A/D converter 16, decoding digital signal processor 17, audio decoding digital signal processor 6, and CPU 8. The decoding digital signal processor 17 detects FCCH based on the I, Q data, equalizes received signal, and error corrects decoded data stream. The audio decoding digital signal processor 6 comprises DSP for processing audio data, and it converts compressed audio signal to an original data stream by decompressing the signal from the data processing circuit 5. And it also converts the signal to an analog signal, and generates speaker 7.

Before these sequence, the subscriber 1 receives signal on the control channel for frame synchronizing by searching FCCH. And it corrects frequency difference by detecting frequency error of the inner clock, receives desired time slot based on predetermined burst signal, and receives desired information in the slot.

Figure 1:
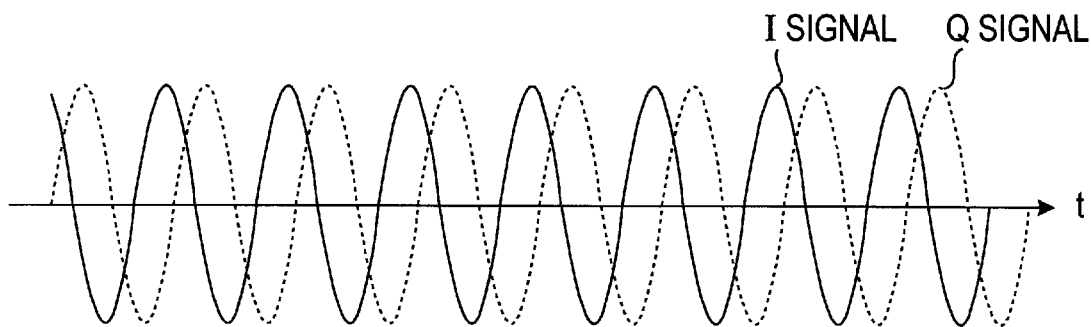
FIG. 1 is a waveform for explaining the transmission of the FCCH.
Figure 4:
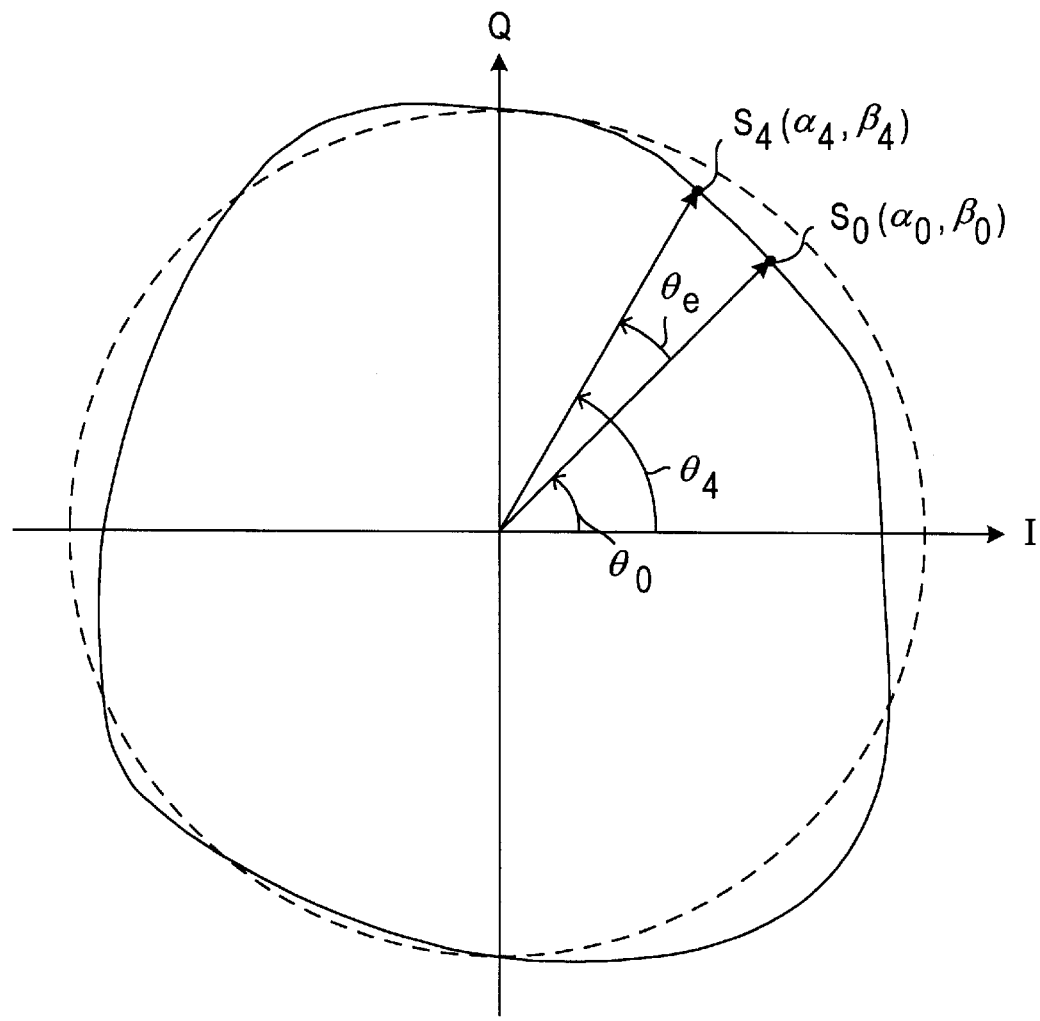
FIG. 4 is a graph for explaining its operation.

Concretely, a receiving process of said FCCH is described to following. First, the A/D converter 16 samples the I, Q signal in a predetermined period, and generates digital I, Q data having 8 bits respectively. The I, Q signal comprised to transmitted FCCH has information component with 90 degree phase difference in each other. On a complex plane of I, Q axes like FIG. 4, the I, Q signal decoded from signal of FCCH generates a locus of circle by rounding $\pi/2$ rad to a direction of counter-clock-wise on the complex plane. But if there is an effect of fading or noise, a level and/or a phase of the I, Q signal of FCCH are changed corresponding to a quantity of the effect, therefore the shape of the locus of circle is distorted. And in the case that an inner clock doesn't synchronize received FCCH signal, a phase difference $\theta$. is occurred between received I, Q data $S_0$ $(\alpha_0, \beta_0)$, $S_4$ $(\alpha_4, \beta_4)$. Because I, Q data are sampled once per one bit, if synchronization is performed correctly, the phases of these $S_0$, $S_4$ should be identical by each four sample.

For detecting these burst signal of FCCH correctly, a signal like FCCH signal is generated in the subscriber. And this generated signal is regarded as reference wave form (reference signal, or template), it is utilized to detect the signal of FCCH by calculating correlation between this reference signal and received signal.

The wave form of this template is the same wave form of ideal FCCH signal without effect of fading or noise. This template is a signal of four bits period, so it is possible to make reference wave form of 4 bits ($t_0 \sim t_s$) like FIG. 5 in advance.

The data processing circuit 5 uses this bit pattern as a reference pattern, and generates reference signal (template) by reading data of this bit pattern sequentially from a memory stored this pattern in advance.

An m th sample of I, Q data are described as $I_m \cdot Q_m$ respectively, and template value and complex conjugate value of m th sample are describes as $T_{im} \cdot T_{qm}$ respectively. And n is a length of correlation value, and $C_m$ is an intermediate value of calculation. Values of $T_{im} \cdot T_{qm}$ are $-1$ or $+1$. Value n means the number of data of correlation calculation. The data processing circuit 5 calculates the intermediate value $C_m$ by following formula (1).

$$C_m = sample_m * template_m \quad (1)$$
$$= (I_m + jQ_m)(T_{im} - jT_{qm})$$
$$= (I_m T_{im} + Q_m T_{qm}) + j(Q_m T_{im} - I_m T_{qm}).$$

A mark * means multiple calculation of a complex value. The data processing circuit 5 calculates complex correlation value $C_{ORR}$ by following formula (2).

$$C_{ORRk} = \sum_{m=k}^{K+n+1} C_m. \quad (2)$$

And a decision whether FCCH signal is able to detect or not is performed by following formula (3). $P_{CORR}$ is a power of detected correlation value, $P_{REC}$ is a power of received signal, and $T_H$ is a threshold value.

$$P_{REC} - P_{CORR} \times T_H <= 0 \quad (3)$$

If this formula (3) is true, then it is regarded to be able to be detected FCCH signal.

$P_{CORR}$ means powered by 2 of a result of detection of correlation value, from following formula (4).

$$P_{CORR} = |C_{ORRk}|^2 \quad (4)$$

$P_{REC}$ means a power of received signal in following formula (5).

$$P_{REC} = I_m^2 + Q_m^2 \quad (5)$$

A decision is made sample by sample in formula (3), if formula (3) is true over more than predetermined sampling periods, then the data processing circuit 5 decides that the signal of FCCH is detected, and it starts frame synchronizing operation from the result of timing detection.

The $C_{ORRk}$ correlation value between I, Q data and template value, converted to base band; increases not only the case of receiving FCCH signal but also the case of increasing level of I, Q signal in accordance with increasing level of received signal.

Therefore, the data processing circuit 5 can detect FCCH signal certainly whether the level of received signal is fluctuated (that is, electric field is fluctuated by changing circumstance of the receiver) by normalizing a result of detected correlation value as a power of received signal after calculating formula (3).

Furthermore, the data processing circuit 5 can achieve improving accuracy of FCCH detection by regarding as being detected FCCH signal in case that formula (3) is successively true through predetermined sampling period.

In this embodiment, FCCH is easily and certainly detected without affection from fading or noise, because FCCH signal is detected based on the correlation value between reference signal and received signal which is converted to digital after converting to base band I, Q signal.

(2) Second Embodiment

Figures 5, 6:
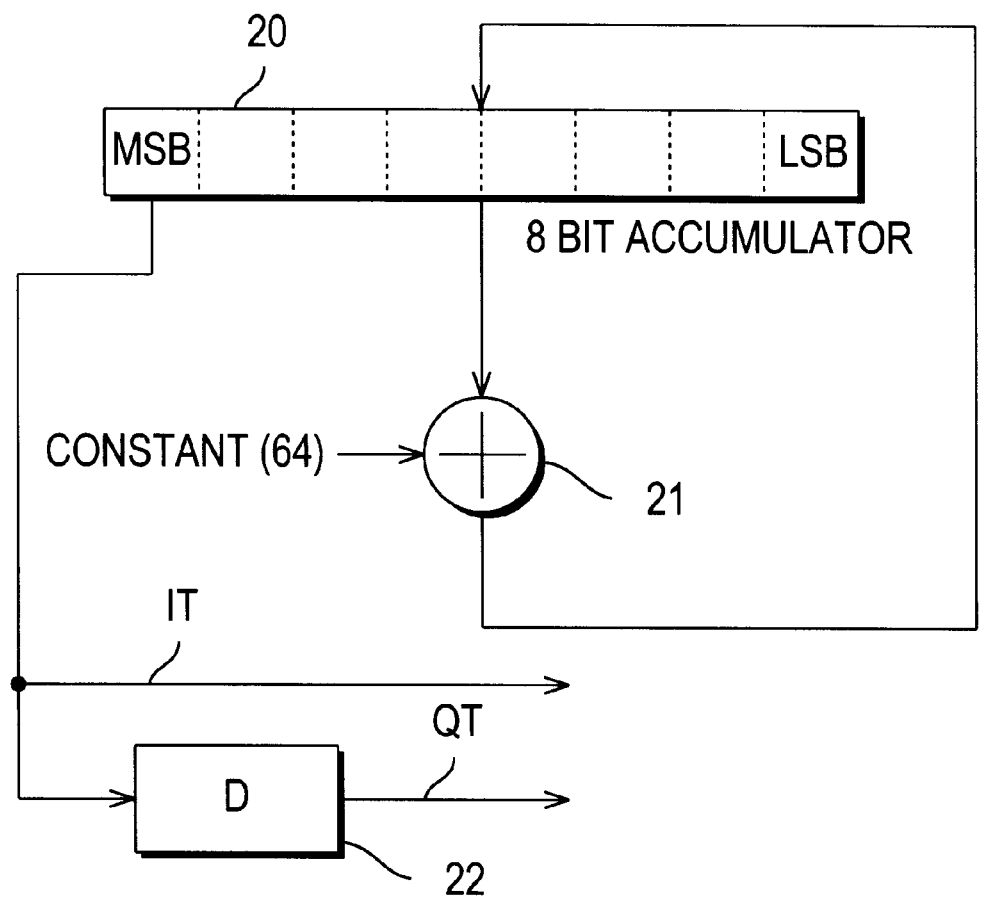
FIG. 5 is a table showing a reference pattern for detecting the FCCH.
FIG. 6 is a block diagram illustrating the second embodiment.

In this embodiment, reference signal is generated by an accumulator 20 in FIG. 6, and a correlation value is detected between this correlation value and received I, Q data. First, the data processing circuit 5 generates 8 bits data from the accumulator 20, adds predetermined constant to this data at an adding circuit 21, and re-accumulates result of adding operation in the accumulator 20.

The data processing circuit 5 performs this adding operation synchronized with an operation of A/D converter 16, and is designed for generating most significant bit of the accumulator as an I template (It) signal (It means reference signal for the I data). The data processing circuit 5 also generates Q template reference signal from I template signal by delaying 1 sampling period in a delay circuit 22.

Figures 7, 8:
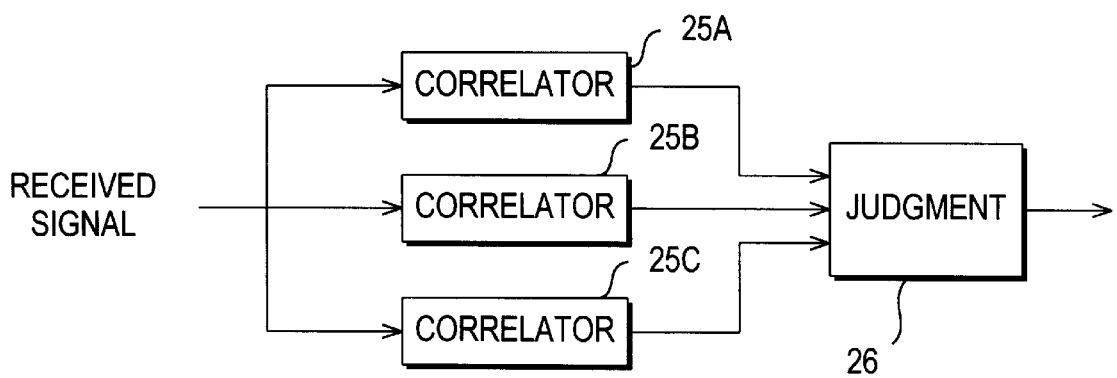
FIG. 7 is a table for explaining its operation.
FIG. 8 is a block diagram illustrating the third embodiment.

In this embodiment, this function is executed by following process. First, an output value of constant to the adding circuit 21 is set 64, and the value is accumulated for generating reference signal as shown in FIG. 7, in a simple structure comprised only accumulator 20 and adding circuit 21. Only varying this constant, the reference signal of different frequency is easily generated.

In GSM standard digital mobile telephone apparatus, a bit rate is 271 kbps, and a frequency of FCCH is a quarter of it, that is 67.7 kHz. The constant value 64 is accumulated, and reference signal is generated at 67.7 kHz.

In a real apparatus, sometimes the frequency of inner clock of the subscriber 1 differs from the frequency of signal from the base station. In this case, even 64 is accumulated, the frequency of the reference signal differs from 67.7 kHz, because the overflow period of the accumulator is different from signal generated by the base station. So the subscriber 1 cannot detect correctly FCCH.

In this embodiment, if signal of FCCH is not detected after predetermined time has passed, the CPU 8 changes constant value to be added to the accumulator 20. In this case, CPU 8 can initialize a content of the accumulator 20 or it need not initialize.

For example, if CPU 8 changes the value from 64 to 63, the period of repeating of reference signal is delayed 1/64 of an original period, because a timing of changing MSB of the accumulator 20.

Therefore, the subscriber 1 can change the frequency of the reference signal easily by changing constant. If there is a frequency error of inner clock, FCCH signal can be detected. And a quantity of this frequency error is detected from this constant value. For example, in the case of changing value from 64 to 63, the frequency of reference signal changes 271/64=4.2 kHz.

An accuracy of detecting FCCH is changeable by changing threshold value of formula (3). If the threshold value is decreased, a possibility to find FCCH is increased, and FCCH is easily detected even if there is much frequency error in the inner clock. But the accuracy of detecting is decreased, because sometimes an apparatus regards that FCCH is detected in a not FCCH timing.

On the contrary, like in this embodiment, if correlation value is detected by a changing of reference signal frequency, possibility of detecting and accuracy of FCCH are both become higher, because FCCH signal is able to be detected in a condition of not so low of the threshold value. In this embodiment, like previous, FCCH is detected by calculating formula (1)–(3) between the reference signal and the received signal.

In FIG. 6, the effect is achieved like the first embodiment, by generating reference signal by adding accumulative the constant. By changing this constant, FCCH is certainly detected even if the frequency of inner clock has discrepancy.

(3) Third Embodiment

In a second embodiment, there is a weak point that it takes much time to detect FCCH because scanning operation is required on several times with varying constant.

In a third embodiment shown in FIG. 8, phase correlation means 25A, 25B, and 25C accumulates different constant respectively. That is, these means generate reference signal with different frequencies simultaneously. Each correlation means 25A, 25B, and 25C calculates formula (1) between received I, Q data and each generated reference signal respectively.

Judgment circuit 26 calculates formula (2) and (3) based on the result of formula (1) from output of the phase correlation means 25A, 25B, and 25C, and it is possible to detect in a short time because it detects FCCH by using three reference signals of different frequency simultaneously.

Judgment circuit 26 detects whether correlation means generates suitable correlation value within the phase correlation means 25A, 25B, and 25C after supplying detecting result to the CPU 8, and performing frame synchronization. That is, it detects the correlation means which gives the biggest correlation value.

Because the subscriber 1 first detects a coarse value of a frequency error by detecting FCCH, it is possible to be higher an accuracy of detecting of frequency error in the next step. The detecting frequency error in the next step means that it detects phase deviation of I, Q data in a complex plane. In this case, the data processing circuit 5 modifies I, Q data value based on the result of FCCH detection, and makes rotation of I, Q phases in a quantity of this frequency error. After this, the data processing circuit 5 detects frequency error.

In this embodiment, it is possible to estimate coarse value of the clock frequency error by investigating which correlation means generates the biggest output in plural correlation means. This estimation is able to make high accuracy of detection of frequency error comparing to the case of not estimated. Using FIG. 8, it is possible to get an effect not only detecting FCCH in a short time by the correlation value detection using plural reference signal with different frequency in parallel but also the effect performed in the second embodiment.

(4) Fourth Embodiment

Figure 9:
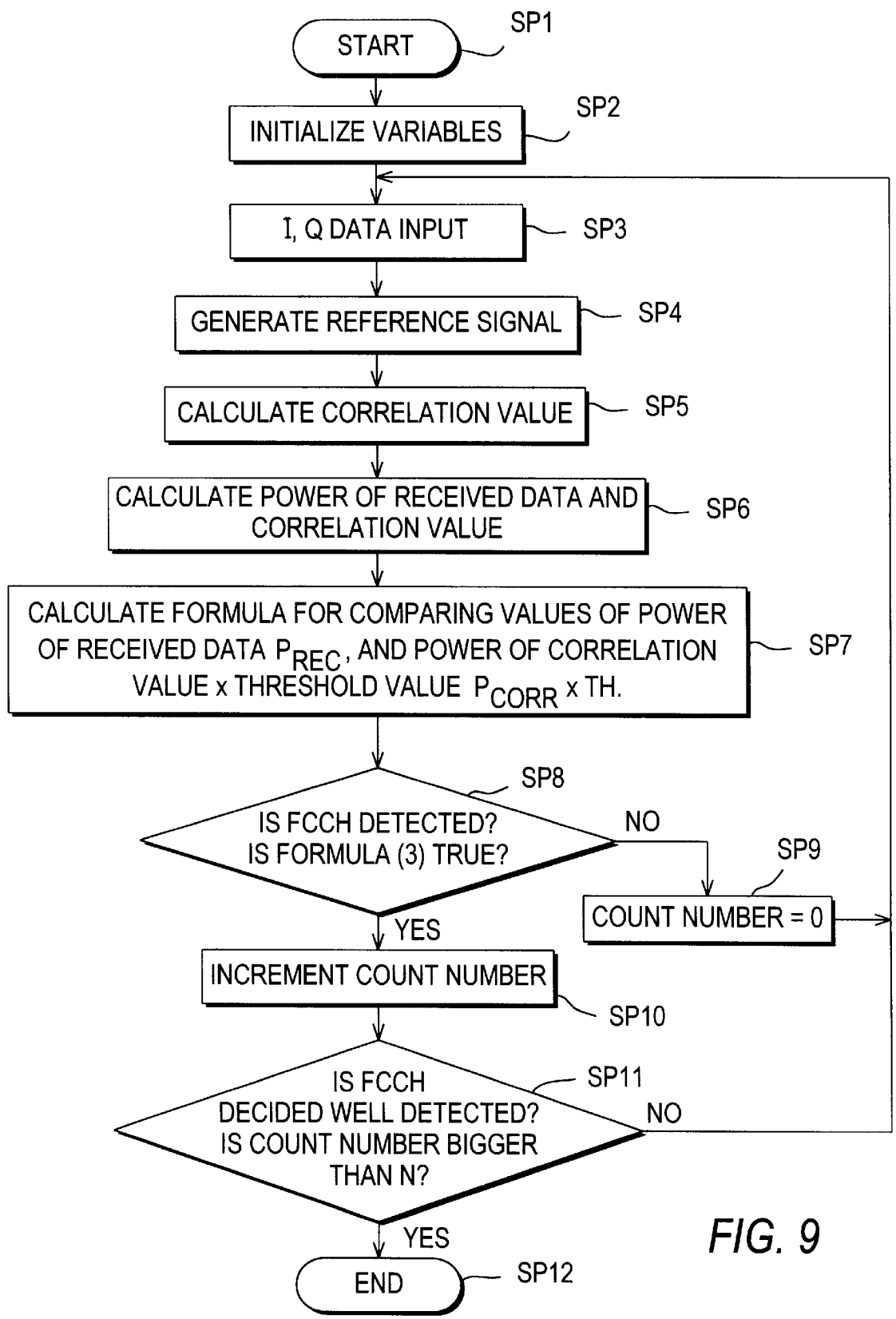
FIG. 9 is a flowchart for explaining the fourth embodiment.

In this embodiment, by executing a flowchart of FIG. 9, an operation of reference signal generation by accumulating predetermined constant and an operation of FCCH detection using this reference signal are performed.

In step SP2, the data processing circuit 5 reset a counter for counting the number of sampling and accumulating to zero. And constant value is set to 64. So, setting of initialization of necessary variables are performed.

In step SP3, the data processing circuit 5 calculates I, Q component of received data. In step SP4, the data processing circuit 5 adds constant 64 to the accumulated value, and generates reference signal referring I data by supplying MSB of accumulated value. In step SP5, formula (1) and (2) are calculated. In step SP6, a power of correlation value and I, Q data of received signal are calculated. In step SP7, a left side and a right side of formula (3) are calculated respectively, and in step SP8, a calculated result is evaluated. That is, it is evaluated whether formula (3) is true or not. If an evaluated result of SP8 is false, the data processing circuit 5 initializes a counter representing the number of sampling, and goes back to the step SP3. The data processing circuit 5 repeats steps SP3-SP4-SP5-SP6-SP7-SP8-SP9-SP3, and if formula (3) is true, then goes to step SP10.

The data processing circuit 5 increments the counter, and evaluates whether the count value reaches predetermined value N in step SP11. That is, a decision is performed whether there is data which satisfies formula (3).

If this decision means false, then goes back to step SP3, and if this decision means true, then goes to step SP12 by evaluating for being detected FCCH, and terminated. In the flowchart of FIG. 9, even the reference signal is generated by software, the same effect of the other embodiment is performed.

(5) The Other Embodiment

In above mentioned embodiments, constant value of accumulating is 64 in example. But this invention is not restricted in that case. For example, in the case that a sampling frequency of I, Q data is twice, the constant can be set 32 which is a half value.

And it is able to perform more detail frequency deviation of the reference signal with more detail frequency variable step by increasing the number of bits in the accumulator 20. It enables to decrease frequency error even if the quantity of the frequency error is small.

In above embodiments, the reference signal of Q data is generated by delaying from the reference signal of I data. But this invention is not restricted in this case, for example, the reference signal of Q data can be generated by delaying 2 bits of the reference signal of I data, in case that the sampling frequency of Q data is twice by setting the constant to 32.

And the reference signal of I, Q data can be generated separately, by using plural accumulators for I and Q data respectively. In this case, an phase offset (differential value of phase between I and Q data) is able to be set to the accumulator as an initial value.

In above embodiments, an FCCH detection evaluation is performed by satisfying formula for continuously more than predetermined number of times. This invention is not restricted to this condition, the condition is able to be easy. For example, the condition is able to be set not only received signal power exceeds whole continuous predetermined number of times but also the power need not exceeding in a several times.

In above embodiments, the correlation value is detected by converting base band signal gotten from an orthogonal detection to I, Q data. This invention is not restricted in this case, for example, it is possible to get base band signal by a delay detection which gets base band signal from a delay circuit supplied IF signal.

In above embodiments, the normalize operation is performed by subtracting from the power of received signal, but it is possible to be performed by dividing.

In above embodiments, this invention is utilized in digital mobile phone apparatus, but it is possible to be utilized in another radio receiver which decodes data stream transmitted with synchronizing signal inserted in a predetermined period.

We claim:

1. A radio receiver apparatus for decoding a received signal based on a predetermined pattern of synchronization signal which is inserted in a predetermined period, comprising:

demodulating means for demodulating the received signal to a base band signal, decoding means for decoding an output signal of said demodulating means to form a data signal;

reference signal generating means for generating a reference signal based on an output signal of said decoding means, comprising adding means for adding a predetermined constant and resister means for accumulating a result of adding; and correlation value detecting means for detecting a complex correlation value between said data signal and said reference signal; wherein said apparatus detects said synchronization signal based on said detected complex correlation value, and decodes based on said detected synchronization signal.

2. A radio receiver apparatus as claimed in claim 1 wherein said reference signal generating means generates said reference signal by reading data from a memorizing means written with the predetermined pattern in advance.

3. A radio receiver apparatus as claimed in claim 2 wherein said reference signal and said predetermined pattern comprise a first data stream and a second data stream respectively.

4. A radio receiver apparatus as claimed in claim 1 wherein said reference signal generating means further comprises;

output generating means for generating a first data stream and a second data stream from an output of said register means.

5. A radio receiver apparatus as claimed in claim 4 wherein said output generating means is a delay means for delaying signal predetermined number of sampling.

6. A radio receiver apparatus as claimed in claim 1 wherein said adding means and said register means comprises;

first adding means and second adding means, and first register means and second register means respectively, wherein said first adding means, second adding means, first register means, and second register means generate first and second data streams respectively.

7. A radio receiver apparatus for decoding a received signal based on a predetermined pattern of synchronization signal which is inserted in a predetermined period, comprising:

demodulating means for demodulating the received signal to a base band signal, decoding means for decoding an output signal of said demodulating means to form a data signal;

reference signal generating means for generating a reference signal based on an output signal of said decoding means; and correlation value detecting means for detecting a complex correlation value between said data signal and said reference signal; wherein said reference signal generating means and said correlation value detecting means are plural respectively, and the apparatus detects the synchronization signal by selecting the most suitable value of the plural correlation values detected by said plural correlation value detecting means and decodes based on said detected synchronization signal.

8. A radio receiver apparatus for decoding a received signal based on a predetermined pattern of synchronization signal which is inserted in a predetermined period, comprising:

demodulating means for demodulating the received signal to a base band signal, decoding means for decoding an output signal of said demodulating means to form a data signal;

reference signal generating means for generating a reference signal based on an output signal of said decoding means; and correlation value detecting means for detecting a complex correlation value between said data signal and said reference signal; wherein said apparatus detects the synchronization signal based on said detected complex correlation value after calculating the power of said correlation value, and decodes based on said detected synchronization signal.

9. A radio receiver apparatus as claimed in claim 8 wherein said detection for synchronization signal is executed by comparing the power of the received signal and a product of the power of said correlation value by a predetermined threshold value.

10. A radio receiver apparatus as claimed in claim 9 wherein in said detection for synchronization signal, a condition is regarded as being satisfied in the case that a result of said comparing is continuously a predetermined state more than a predetermined number of times or more than a predetermined time.

11. A radio receiving method for decoding a received signal based on a predetermined pattern of synchronization signal which is inserted in a predetermined period, comprising:

a demodulating step for demodulating a received signal to a base band signal;

a decoding step for decoding an output signal of said demodulating step to a data signal;

a reference signal generating step for generating a reference signal based on an output signal of said decoding step, comprising an adding step for adding a predetermined constant, and a registering step for accumulating a result of said adding step; and a correlation value detecting step for detecting a complex correlation value between said data signal and said reference signal, wherein;

the method includes steps of:

detecting the synchronization signal based on said detected complex correlation value; and decoding based on said detected synchronization signal.

12. A radio receiving method as claimed in claim 11 wherein said reference signal generating step generates said reference signal by reading data from a memorizing means written with the predetermined pattern in advance.

13. A radio receiving method as claimed in claim 12 wherein said reference signal and said predetermined pattern comprise a first data stream and a second data stream respectively.

14. A radio receiving method as claimed in claim 11 wherein said reference signal generating step further comprises:

an output generating step for generating a first data stream and a second data stream from an output of said registering step.

15. A radio receiving method as claimed in claim 14 wherein said output generating step is a delay step for delaying signal predetermined number of sampling.

16. A radio receiving method as claimed in claim 11 wherein said adding step and said registering step comprise:
- a first adding step and a second adding step; and
- a first registering step and a second registering step respectively, wherein;
- said first adding step, second adding step, first registering step, and second registering step generate first and second data streams respectively.

17. A radio receiving method for decoding a received signal based on a predetermined pattern of synchronization signal which is inserted in a predetermined period, comprising:
- a demodulating step for demodulating s received signal to a base band signal;
- a decoding step for decoding an output signal of said demodulating step to a data signal;
- a reference signal generating step for generating a reference signal based on an output signal of said decoding step; and
- a correlation value detecting step for detecting a complex correlation value between said data signal and said reference signal; wherein
- said reference signal generating step and said correlation value detecting step are executed in plural in parallel respectively; and
- the method includes detecting the synchronization signal by selecting the most suitable value of the plural correlation values detected by said plural correlation value detecting step and decoding based on said detected synchronization signal.

18. A radio receiving method for decoding a received signal based on a predetermined pattern of synchronization signal which is inserted in a predetermined period, comprising:
- a demodulating step for demodulating s received signal to a base band signal;
- a decoding step for decoding an output signal of said demodulating step to a data signal;
- a reference signal generating step for generating a reference signal based on an output signal of said decoding step; and
- a correlation value detecting step for detecting a complex correlation value between said data signal and said reference signal, wherein said method includes detecting the synchronization signal based on said detected complex correlation value after calculating the power of said correlation value; and decoding based on said detected synchronization signal.

19. A radio receiving method as claimed in claim 18 wherein said detection for synchronization signal is executed by comparing the power of the received signal and a product of the power of said correlation value by a predetermined threshold value.

20. A radio receiving method as claimed in claim 19 wherein in said detection for synchronization signal, a condition is regarded as being satisfied in the case that a result of said comparing is continuously a predetermined state more than a predetermined number of times or more than a predetermined time.

* * * * *